(12) United States Patent
Jeong et al.

(10) Patent No.: US 12,224,615 B2
(45) Date of Patent: Feb. 11, 2025

(54) COMPOSITE CHARGING SYSTEM AND METHOD

(71) Applicant: HYOSUNG CORPORATION, Seoul (KR)

(72) Inventors: Byung Hwan Jeong, Gwacheon-si (KR); Jeong Min Lee, Seoul (KR); Byeng Joo Byen, Suwon-si (KR)

(73) Assignee: HYOSUNG CORPORATION, Seoul (KR)

( * ) Notice: Subject to any disclaimer, the term of this patent is extended or adjusted under 35 U.S.C. 154(b) by 70 days.

(21) Appl. No.: 18/011,790

(22) PCT Filed: Nov. 19, 2021

(86) PCT No.: PCT/KR2021/017117
§ 371 (c)(1),
(2) Date: Dec. 20, 2022

(87) PCT Pub. No.: WO2022/239920
PCT Pub. Date: Nov. 17, 2022

(65) Prior Publication Data
US 2023/0246472 A1    Aug. 3, 2023

(30) Foreign Application Priority Data

May 14, 2021   (KR) .................. 10-2021-0062940

(51) Int. Cl.
*B60L 53/30*     (2019.01)
*B60L 53/50*     (2019.01)
(Continued)

(52) U.S. Cl.
CPC ........ *H02J 7/007188* (2020.01); *B60L 53/30* (2019.02); *B60L 53/50* (2019.02);
(Continued)

(58) Field of Classification Search
CPC .... G05B 2219/2639; H02J 7/34; H02J 3/144; H02J 2310/64; H02J 3/32; H02J 7/00;
(Continued)

(56) References Cited

U.S. PATENT DOCUMENTS

| 2004/0169489 A1* | 9/2004 | Hobbs | H02J 7/007182 320/104 |
| 2004/0174072 A1* | 9/2004 | Bourilkov | H02J 7/34 307/66 |

(Continued)

FOREIGN PATENT DOCUMENTS

| JP | 6005503 B2 | 10/2016 |
| JP | 2017107702 A * | 6/2017 |

(Continued)

*Primary Examiner* — Elim Ortiz
(74) *Attorney, Agent, or Firm* — NKL Law; Jae Youn Kim

(57) ABSTRACT

The present invention relates to a composite charging system and method capable of producing charging power for an electric vehicle by utilizing hydrogen energy supplied to a hydrogen vehicle, and compositely connecting hydrogen energy with a power system to efficiently perform charging of the electric vehicle, and more flexibly coping with the use of energy.

The composite charging system according to the present invention comprises: a hydrogen charger which charges hydrogen into a vehicle; a hydrogen power supply system which generates and supplies power on the basis of hydrogen; a system power supply system which supplies power from a power system; an electric charger which charges the electric vehicle; and a battery power supply system which stores power supplied from the hydrogen power supply system and the system power supply system, and supplies the stored power to the electric charger.

3 Claims, 5 Drawing Sheets

(51) Int. Cl.
  *B60L 53/64*    (2019.01)
  *G06Q 50/06*   (2024.01)
  *H01M 8/04082* (2016.01)
  *H01M 8/04858* (2016.01)
  *H01M 16/00*   (2006.01)
  *H02J 3/32*    (2006.01)
  *H02J 7/00*    (2006.01)

(52) U.S. Cl.
  CPC .............. *B60L 53/64* (2019.02); *G06Q 50/06* (2013.01); *H01M 8/04201* (2013.01); *H01M 8/04925* (2013.01); *H01M 16/006* (2013.01); *H02J 3/32* (2013.01); *B60L 2210/10* (2013.01); *B60L 2210/30* (2013.01); *H01M 2250/20* (2013.01); *H02J 2207/20* (2020.01)

(58) Field of Classification Search
  CPC ............. H02J 7/007188; H02J 2207/20; H02J 2310/48; B60L 53/11; B60L 53/64; B60L 53/30; B60L 53/50; B60L 2210/10; B60L 2210/30; B60L 53/305; B60L 53/63; B60L 53/65; B60L 58/40; G06Q 50/06; H01M 10/44; H01M 16/006; H01M 8/04201; H01M 8/04925; H01M 2250/20; Y02T 10/70; Y02T 10/7072; Y02T 90/12
  See application file for complete search history.

(56) References Cited

U.S. PATENT DOCUMENTS

| | | | |
|---|---|---|---|
| 2013/0218356 A1 | 8/2013 | Lee et al. | |
| 2018/0358839 A1* | 12/2018 | Perez | H02J 3/46 |
| 2022/0140365 A1* | 5/2022 | Mun | H01M 16/003 |
| | | | 429/400 |

FOREIGN PATENT DOCUMENTS

| | | | |
|---|---|---|---|
| KR | 10-2011-0041336 | A | 4/2011 |
| KR | 10-2012-0072192 | A | 7/2012 |
| KR | 10-2012-0076629 | A | 7/2012 |
| KR | 10-2228132 | B1 | 7/2012 |
| KR | 10-2018-0051012 | A | 5/2018 |
| KR | 10-2018-0058623 | A | 6/2018 |

* cited by examiner

COMPOSITE CHARGING SYSTEM AND METHOD

FIELD OF THE INVENTION

The present invention relates to a composite charging system and method; and more particularly to, the composite charging system and method for performing charging of an electric vehicle and charging of a hydrogen vehicle in a composite manner. In other words, the present invention relates to the composite charging system and method capable of effectively charging on the whole of the system by considering a charging cost of the electric vehicle while performing the charging of the electric vehicle and the charging of the hydrogen vehicle in the composite manner.

BACKGROUND OF THE INVENTION

Recently, as energy and environmental problems have emerged as major issues, interest in electric vehicles or hydrogen vehicles with high efficiency and low emission compared to existing internal combustion engine vehicles is increasing.

In addition, due to the development of electric vehicles, new vehicles with internal combustion engines will be discontinued, and a lot of countries including Europe and China will rapidly develop and supply electric vehicles.

Such electric vehicles may be charged at parking spaces at work and home in addition to specialized charging stations, and it usually takes at least 4-6 hours for slow charging and at least 30 minutes to one hour even upon rapid charging. Accordingly, general users are expected to mostly charge their electric vehicles intensively in time zones before going to work or after work.

Meanwhile, if eco-friendly vehicles are increased, charging rates will be highly possible to be raised higher than the current rates, and as the possibility of the rates fluctuating depending on time zones such as off-peak, peak, and high-peak time zones just like electricity rates emerges, studies on systems for overcoming this continue.

As an example, Korean Patent Publication No. 10-2019-0080177 discloses an electric vehicle charging station for managing peak power by utilizing a power grid of Korea Electric Power Corporation as well as a tri-gen system, and providing an electric vehicle charging service in a form composite with a convenience facility by utilizing cooling and heating energy produced from the tri-gen system, and a method of operating the electric vehicle charging station.

However, even this case has a limitation in utilizing cooling and heating energy, and it cannot utilize hydrogen energy for increasing number of hydrogen vehicles in addition to electric vehicles.

DETAILED EXPLANATION OF THE INVENTION

Objects of the Invention

An object of the present invention is to provide a composite charging system and method for generating charging power of an electric vehicle by utilizing hydrogen energy supplied to a hydrogen vehicle.

The object of the present invention is to provide a composite charging system and method for performing effectively charging of an electric vehicle and using energy flexibly by integrating the hydrogen energy and the DC power grid while performing charging of the hydrogen vehicle and the electric vehicle at the same time.

Means of Solving the Problem

A composite charging system in accordance with one example embodiment of the present invention may comprise: a hydrogen charger for charging hydrogen to a vehicle; a hydrogen-based power supply system for generating and supplying power based on hydrogen; a power grid-based supply system for supplying power from a power grid; an electrical charger for charging an electric vehicle; and a battery power supply system for storing power supplied from the hydrogen-based power supply system and the power grid-based supply system, and supplying the stored power to the electrical charger.

Herein, the hydrogen-based power supply system may include: a hydrogen tank for storing hydrogen; a hydrogen power generator for generating power from the hydrogen; and a DC-DC converter for converting a DC voltage outputted from the hydrogen power generator to a DC voltage required for input to the electrical charger.

In addition, the power grid-based supply system may include: a grid matcher for matching the power grid with a transformer; and an AC-DC converter for converting an AC voltage outputted from the grid matcher to a DC voltage required for input to the electrical charger.

Besides, the battery power supply system includes: an energy storage system (ESS) for storing power and discharging the stored power; and a DC-DC converter for storing power supplied from the hydrogen-based power supply system and the power grid-based supply system, and converting a DC voltage outputted from the ESS to a DC voltage required for input to the electrical charger.

Meanwhile, in an off-peak time, as a result of comparison between a charging cost through a power grid and a hydrogen charging cost through the hydrogen-based power generation, if the charging cost during the off-peak time is lower, power may be charged from the power grid-based supply system, and if the hydrogen charging cost is lower, power may be charged from the hydrogen-based power supply system.

Besides, in a peak time, as a result of comparison between a charging cost through a power grid and a hydrogen charging cost through the hydrogen-based power generation, if the charging cost during the peak time is lower, power may be charged from the power grid-based supply system, and if the hydrogen charging cost is lower, power may be charged from the hydrogen-based power supply system.

In addition, in a high-peak time, as a result of comparison between a charging cost through a power grid and a hydrogen charging cost through the hydrogen-based power generation, if the charging cost in the high-peak time is lower, power may be charged from the power grid-based supply system, and if the hydrogen charging cost is lower, power may be charged from the hydrogen-based power supply system.

Meanwhile, a composite charging method in accordance with another example embodiment of the present invention may include steps of: receiving a request for charging an ESS; comparing a charging cost through a power grid with a charging cost through the hydrogen-based power generation; and charging power through the power grid or through the hydrogen-based power supply system as a result of the comparison.

Herein, the step of comparing the charging costs may include: a step of determining whether a time is an off-peak time or not, and a step of comparing a charging cost through a power grid with a charging cost through the hydrogen-based power generation during the off-peak time; and at the step of charging power, as a result of the comparison, if the charging cost during the off-peak time is lower than the hydrogen charging cost, power may be charged from the power grid-based supply system, and if the hydrogen charging cost is lower than the charging cost during the off-peak time, power may be charged from the hydrogen-based power supply system.

In addition, the step of comparing the charging costs may include steps of: determining whether the time is a peak time or not, and comparing a charging cost through the power grid and a hydrogen charging cost through the hydrogen-based power generation during the peak time; and at the step of charging power, as a result of the comparison, if the charging cost during the peak time is lower than the hydrogen charging cost, power may be charged from the power grid-based supply system, and if the hydrogen charging cost is lower than the charging cost during the peak time, power may be charged from the hydrogen-based power supply system.

Besides, the step of comparing the charging costs may include steps of: determining whether the time is a high-peak time or not, and comparing a charging cost through the power grid and a hydrogen charging cost through the hydrogen-based power generation during the high-peak time; and at the step of charging power, as a result of the comparison, if the charging cost in the high-peak time is lower than the hydrogen charging cost, power may be charged from the power grid-based supply system, and if the hydrogen charging cost is lower than the charging cost in the high-peak time, power may be charged from the hydrogen-based power supply system.

Effects of the Invention

In accordance with the present invention, a composite charging system and method have an effect of generating charging power for an electric vehicle by utilizing hydrogen energy supplied to a hydrogen vehicle.

In addition, the composite charging system and method in accordance with the present invention have an effect of performing effectively charging of an electric vehicle and using energy flexibly by integrating the hydrogen energy and the DC power grid while performing charging of the hydrogen vehicle and the electric vehicle at the same time.

Besides, they have an effect of basically performing a function of a charger, and also helping in stabilizing a power grid with supplying power to the power grid by utilizing a bidirectional AC-DC converter in the grid, if power generation is required due to unstable supply and demand of the power grid.

DETAILED DESCRIPTION OF THE PREFERRED EMBODIMENTS

Detailed example embodiments to implement the present invention will be explained below by referring to attached drawings.

Since the present invention may make a variety of modifications, and have several example embodiments, specific example embodiments will be illustrated in diagrams, and explained in details. This is not intended to limit specific embodiments which specify the present invention, and it may be understood to include all modifications, equivalents, or substitutes included in the thought and technical scope of the present invention.

Detailed explanation will be made on a composite charging system and method in accordance with the present invention by referring to the attached drawings.

Figure 1:
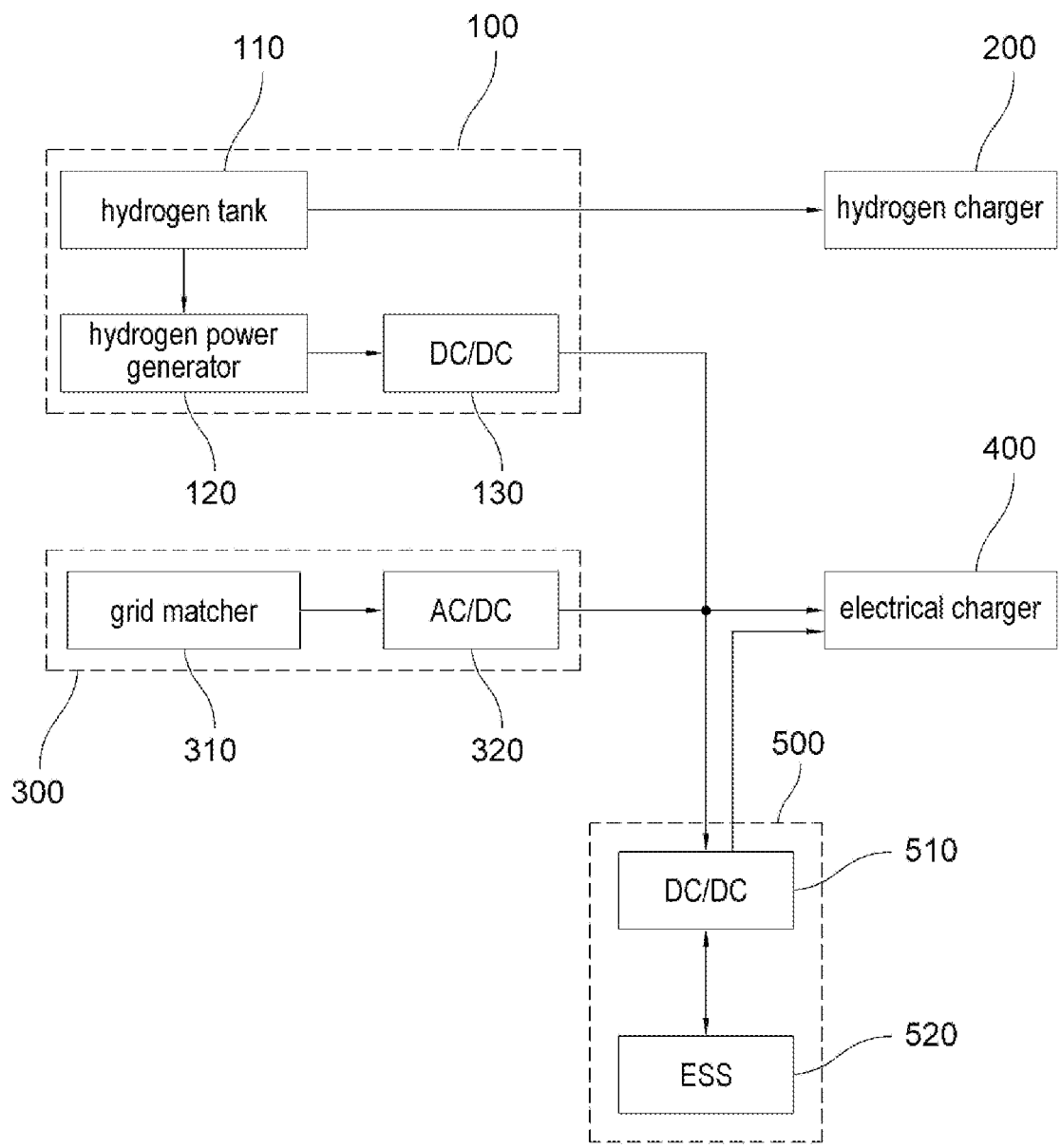
FIG. 1 is a schematic diagram illustrating a composite charging system in accordance with one example embodiment of the present invention.
Figure 2:
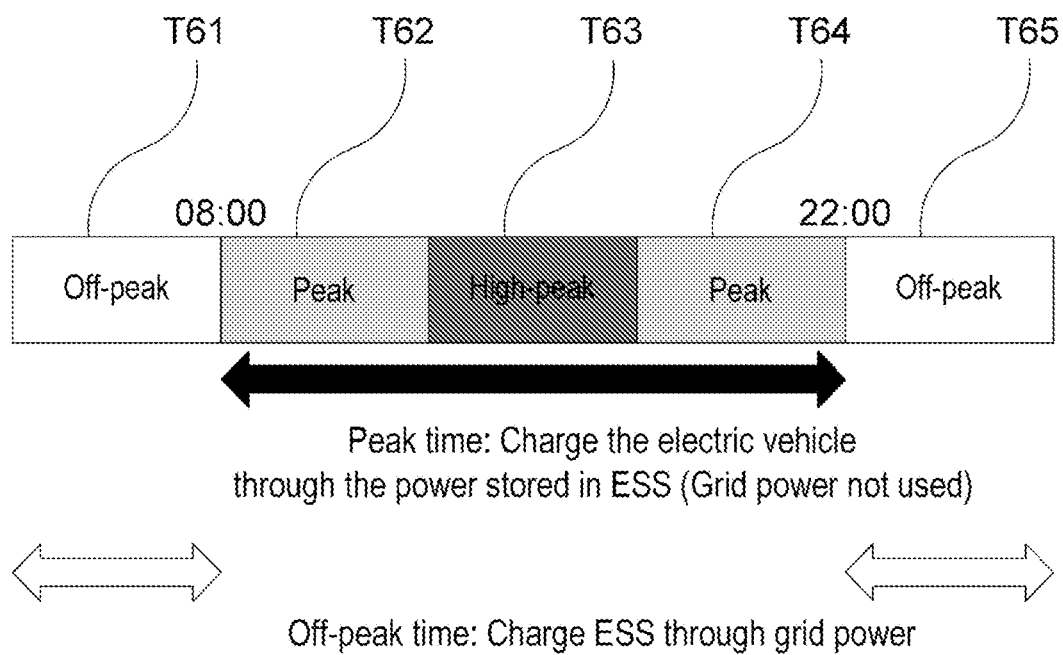
FIG. 2 is a drawing illustrating an ESS by using the power grid-based supply system in FIG. 1.
Figure 3:
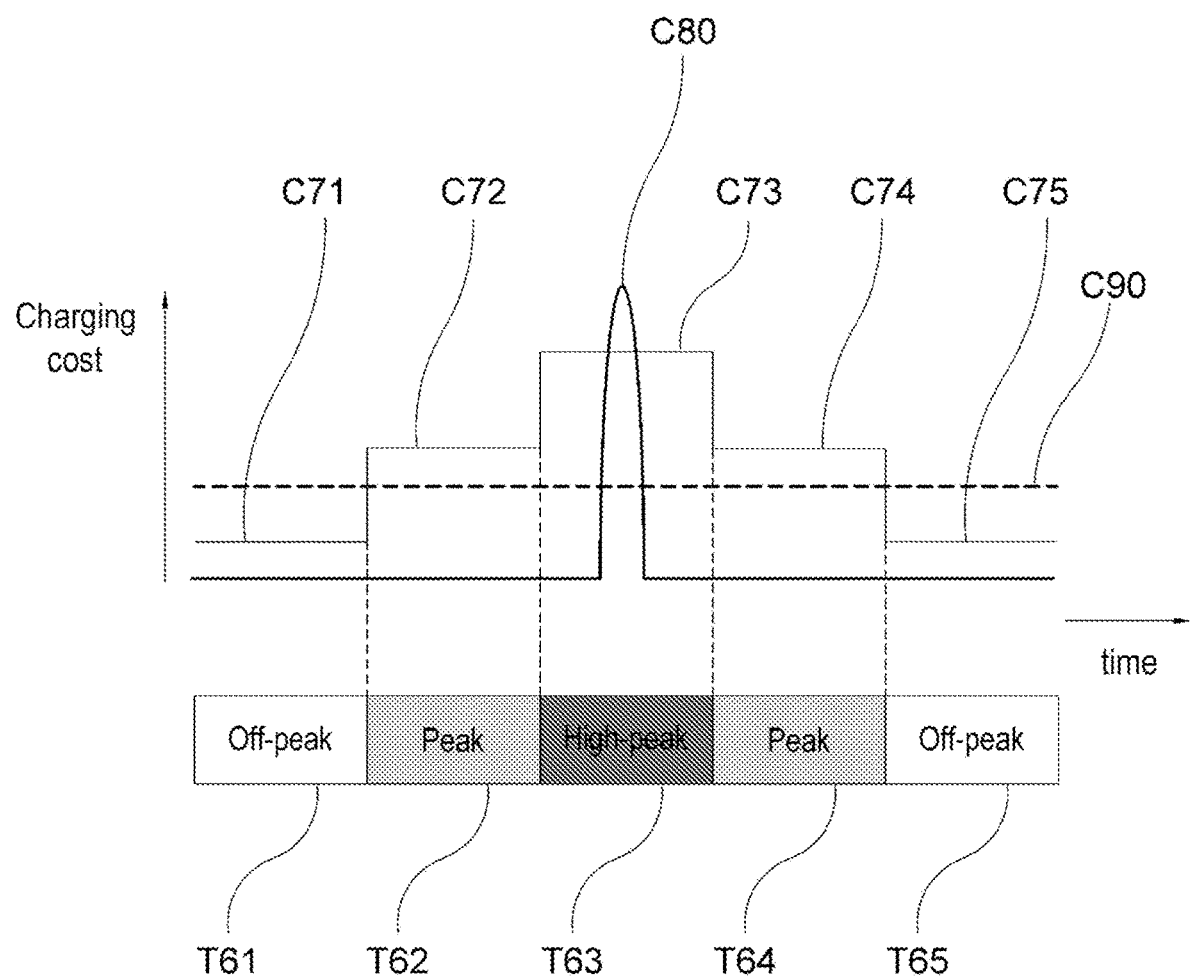
FIG. 3 is a drawing explaining an ESS by using the power grid-based supply system and the hydrogen-based power supply system together in FIG. 1.

FIG. 1 is a schematic diagram illustrating a composite charging system in accordance with one example embodiment of the present invention, and FIGS. 2 and 3 are detailed drawings to explain FIG. 1 in detail.

By referring to FIGS. 1 to 3, the composite charging system in accordance with one example embodiment of the present invention will be explained.

Firstly, by referring to FIG. 1, the composite charging system in accordance with one example embodiment of the present invention comprises: a hydrogen charger 200 for charging hydrogen to a vehicle; a hydrogen-based power supply system 100 for generating and supplying power based on hydrogen; a power grid-based supply system 300 for supplying power from a power grid; an electrical charger 400 for charging an electric vehicle; and a battery power supply system 500 for storing power supplied from the hydrogen-based power supply system and the power grid-based supply system, and supplying the stored power to the electrical charger.

Herein, the hydrogen-based power supply system 100 includes: a hydrogen tank 100 for storing hydrogen; a hydrogen power generator 120 for generating power from the hydrogen; and a DC-DC converter 130 for converting a DC voltage outputted from the hydrogen power generator 120 to a DC voltage required for input to the electrical charger 400.

In addition, the power grid-based supply system 300 includes: a grid matcher 310 for matching the power grid with a transformer; and an AC-DC converter 320 for converting an AC voltage outputted from the grid matcher 310 to a DC voltage required for input to the electrical charger 400.

Herein, the battery power supply system 500 includes: an ESS 520 for storing power and discharging the stored power; and a DC-DC converter 510 for storing power supplied from the hydrogen-based power supply system 100 and the power grid-based supply system 300, and converting a DC voltage outputted from the ESS 520 to a DC voltage required for input to the electrical charger 400.

In other words, while using hydrogen stored in the hydrogen tank 110 for charging a hydrogen vehicle, the composite charging system in accordance with the present invention may also generate power with the stored hydrogen to charge an electric vehicle.

The costs of power supplied from the power grid are different depending on time zones, and particularly, it is very important to lower the peak due to a characteristic of a cost based on which an electricity rate on the current day depending on a peak value of power. In particular, when the electric vehicle is charged, a peak must occur (e.g., C80 in FIG. 3), and therefore, the present invention has an ESS 520 which may supply power to the electrical charger 400 to lower a peak value if such peak occurs.

Besides, to cost-effectively perform charging the ESS 520 to lower the peak upon charging, it is necessary to store power in advance at a time zone where the cost of supplied power is the cheapest, and use the power to charge the electric vehicle. In other words, the cost of power supplied varies at each time zone of charging a battery. In general, as the cost of the power is very high in the daytime when power demand is concentrated, it is desirable to charge the ESS 520 by avoiding the daytime.

In the present invention, hydrogen in the hydrogen tank 110 may be supplied to a hydrogen vehicle through the hydrogen charger 200, and power may be generated through the hydrogen power generator 120 and supplied to the battery power supply system 500 through the DC-DC converter 130.

Meanwhile, the power supplied from the power grid is converted to DC output from the AC-DC converter 320 via the grid matcher 310 composed of a transformer, and then supplied to the battery power supply system 500. At the time, the battery power supply system 500 may use the DC-DC converter 510 to charge power to the ESS 520, and the DC-DC converter 510, and also use the power stored in the ESS 520 to charge the electric vehicle by supplying the power to the electrical charger 400.

The composite charging system in accordance with the present invention may compare a charging cost of the ESS 520 by using the hydrogen power generator 120 with that of the ESS 520 by using power supplied to the power grid, and select a cheaper charging cost to charge the battery, and this allows the system to generally charge effectively.

FIG. 2 is a drawing illustrating the ESS 520 by using the power grid-based supply system in FIG. 1.

As can be seen in FIG. 2, the cost of the power supplied from the power grid varies by each time zone. In general, an off-peak time T65 after 10 p.m. and an off-peak time T61 until 8 a.m. from dawn are a time zone where the electricity rate is the cheapest. Charging the ESS 520 at the time zone through the power grid is effective from the cost side.

A peak time T62 after 8 a.m. and a peak time T64 before 10 p.m. are a peak time zone, and charging an electric vehicle with the power stored in the ESS 520 is cost-effective. In addition, during a high-peak time T63 when the cost of the power supplied is the highest, charging the electric vehicle with the power stored in the ESS 520 is desirable in terms of cost.

However, if the power capacity stored in the ESS 520 compared to the electric vehicle to be charged is insufficient, the ESS 520 will be required to be charged through the power grid even during the peak time T62, the high-peak time T63, and the peak time T64 where the charging cost is high, and this may cause a phenomenon to increase the charging cost.

FIG. 3 is a drawing explaining a case of using the power grid-based supply system 300 and the hydrogen-based power supply system 100 together in FIG. 1.

By referring to FIG. 3, the composite charging system in accordance with the present invention compares a charging cost C71 during an off-peak time through the power grid with a hydrogen charging cost C90 through the hydrogen-based power supply system 100, and charges power from the power grid-based supply system 300, and the composite charging system charges power from the power grid-based supply system 300 if the charging cost C71 during the off-peak time is lower, and through the hydrogen-based power supply system 100 if the hydrogen charging cost C90 is lower.

In addition, in peak times T62 and T64, the composite charging system compares charging costs C72 and C74 during the peak times through the power grid with the hydrogen charging cost C90 through the hydrogen-based power supply system, and charges the power through the power grid-based supply system 300 if the charging costs C72 and C74 during the peak times are lower, and through the hydrogen-based power supply system 100 if the hydrogen charging cost C90 is lower.

In a high-peak time T63, the composite charging system compares a charging cost C73 during the high peak time through the power grid with the hydrogen charging cost C90 through the hydrogen-based power supply system, and charges the power through the power grid-based supply system 300 if the charging cost C73 during the high-peak time is lower, and through the hydrogen-based power supply system 100 if the hydrogen charging cost C90 is lower.

As seen in FIG. 2, when charging is performed by using the power grid-based supply system 300, if the capacity stored in the ESS 520 is insufficient compared with the electric vehicle to be charged, charging should be performed through the power grid even during the peak time T62, the high-peak time T63, and the peak time T64. Therefore, there occurs a situation where the ESS 520 should be charged at a high cost.

However, in the present invention, it is possible to charge power cost-effectively in all time zones with the power grid-based supply system 300 and the hydrogen-based power supply system 100 together by means of charging the ESS 520 with the hydrogen-based power generation, instead of the power grid, if the charging cost by using the hydrogen-based power generation is cheaper than the charging cost through the power grid.

For example, during off-peak times T61 and T65, if the hydrogen charging cost C90 is lower than charging costs C71 and C75 during the off-peak times through the power grid, charging may be performed through the hydrogen-based power generation, not through the power grid.

Besides, if the hydrogen charging cost C90 through the hydrogen-based power generation is lower than the charging costs C72 and C74 during the peak times T62 and T64 through the power grid, charging may be performed through the hydrogen-based power generation, not through the power grid. In addition, during the high-peak time T63, if the hydrogen charging cost C90 through the hydrogen-based power generation is lower than the charging cost C72 during the high-peak time through the power grid, power may be charged by using the hydrogen-based power generation, instead of the power grid, as explained above.

Accordingly, according to the composite charging system in the present invention, it is possible to charge power by comparing a charging cost using power supplied from the power grid with a charging cost using the hydrogen-based power generation and selecting a cheaper charging cost. Therefore, the cost for charging the electric vehicle may be generally reduced.

In accordance with an example embodiment, the hydrogen charging cost through the hydrogen-based power generation may be differently set depending on a unit price of purchasing hydrogen when hydrogen is charged in the hydrogen tank, or periodically updated by an operator.

Besides, depending on an example embodiment, even if the hydrogen charging cost through the hydrogen-based power generation is lower than the charging cost through the power grid, charging may be performed through the power grid when the residual capacity of hydrogen stored in the hydrogen tank is not enough.

Figure 4:
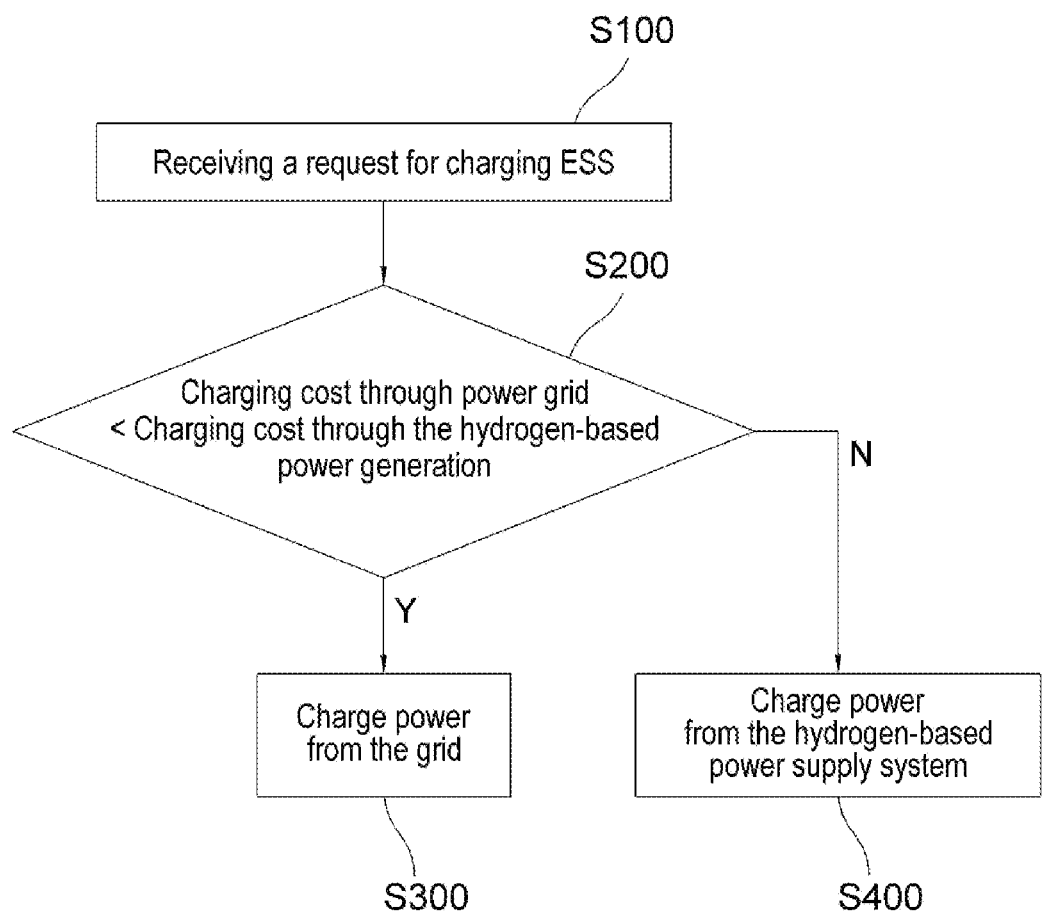
FIG. 4 is a flowchart illustrating a composite charging method in accordance with one example embodiment of the present invention.
Figure 5:
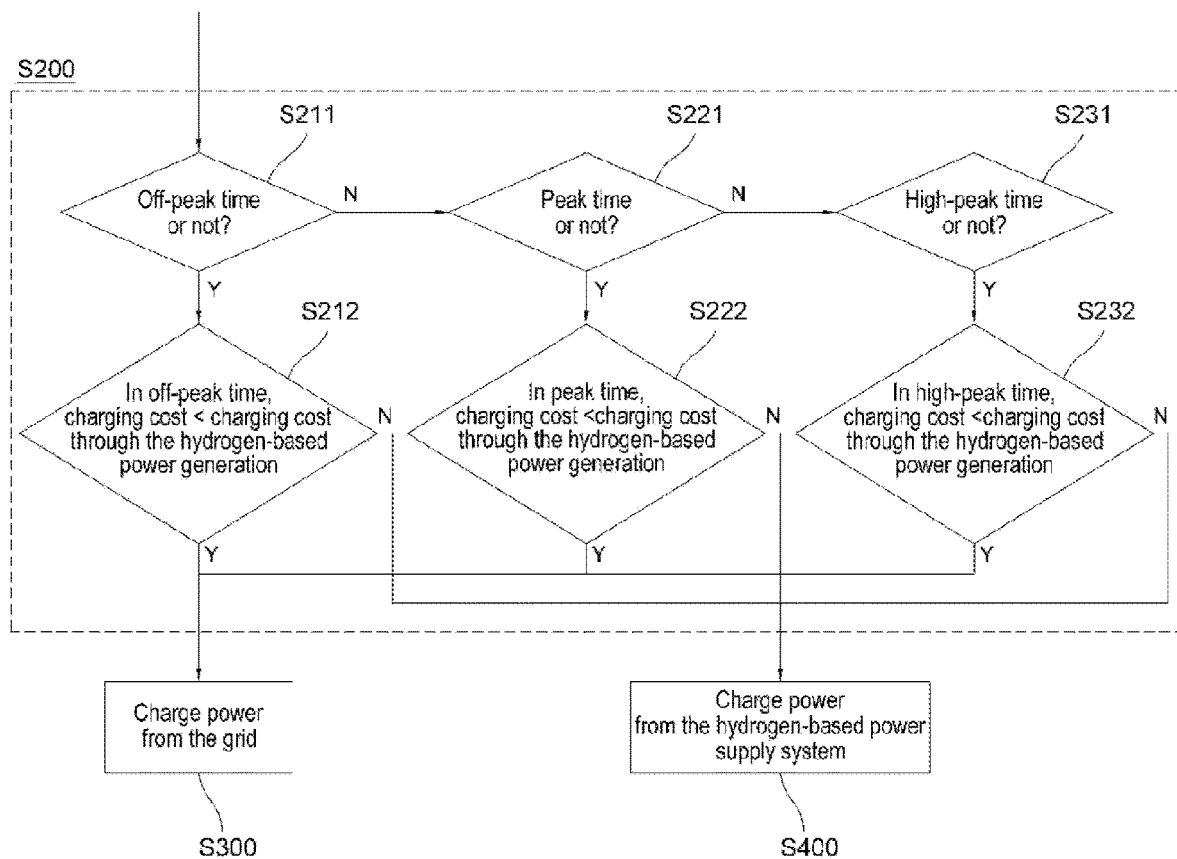
FIG. 5 is a flowchart illustrating a step of comparing charging costs in FIG. 4 in detail.

FIG. 4 is a flowchart illustrating a composite charging method in accordance with one example embodiment of the present invention, and FIG. 5 is a detailed flowchart illustrating a step of comparing charging costs in FIG. 4.

Below is explanation on a composite charging method in accordance with one example embodiment of the present invention by referring to FIGS. 4 and 5.

By referring to FIG. 4, the composite charging method in accordance with one example embodiment of the present invention comprises steps of: receiving a request for charging an ESS 520 at S100; comparing a charging cost through a power grid with a charging cost through a hydrogen-based power generation at S200; and charging power, as a result of the comparison, through the power grid at S300 or through the hydrogen-based power generation at S400.

In the present invention, while being supplied to a hydrogen vehicle through a hydrogen charger 200, hydrogen in a hydrogen tank 110 may be used to generate power through a hydrogen power generator 120, and charge the ESS 520.

In other words, the composite charging method in the present invention may be used to charge an electric vehicle by generating power with the hydrogen stored in the hydrogen tank 110. Charging an electric vehicle may be performed effectively on the whole of a system by comparing a charging cost using the hydrogen power generator 120 with a charging cost using power supplied from the power grid, selecting a cheaper cost, and charging the ESS 520.

FIG. 5 is a flowchart illustrating a step S200 of comparing charging costs in FIG. 4 in detail.

As can be seen in FIG. 5, the step S200 of comparing charging costs in the present invention includes: a step S211 of determining whether the time is an off-peak time or not, and a step S212 of comparing a charging cost through a power grid with a charging cost through a hydrogen-based power generation during the off-peak time. As a result of the comparison, if the charging cost during the off-peak time is lower than the hydrogen charging cost, power is charged from the power grid-based supply system 300, and reversely, if the hydrogen charging cost is lower than the charging cost during the off-peak time, power is charged from the hydrogen-based power supply system 100.

Besides, the step S200 of comparing charging costs includes: steps of: determining whether the time is a peak time or not at 221, and comparing a charging cost through the power grid and a hydrogen charging cost through the hydrogen-based power generation during the peak time at S222. As a result of the comparison, if the charging cost during the peak time is lower than the hydrogen charging cost, power is charged from the power grid-based supply system 300, and reversely, if the hydrogen charging cost is lower than the charging cost during the peak time, power is charged from the hydrogen-based power supply system 100.

In addition, the step S200 of comparing charging costs includes: a step S231 of determining whether a time is a high-peak time or not, and a step S232 of comparing a charging cost during the high-peak time through the power grid with a hydrogen charging cost through the hydrogen-based power generation. As a result of the comparison, if the charging cost during the high-peak time is lower than the hydrogen charging cost, power is charged from the power grid-based supply system 300, and reversely, if the hydrogen charging cost is lower than the charging cost during the high-peak time, power is charged from the hydrogen-based power supply system 100.

As explained above, the cost of the power supplied from the power grid varies depending on time, and particularly, it is very important to lower the peak due to a characteristic of a cost that an electricity rate on the current day is decided depending on a peak value of power. In particular, when the electric vehicle is charged, the peak must occur (e.g., C80 in FIG. 3), and therefore, the present invention has the ESS 520 which may supply power to the electrical charger 400 to lower the peak value upon occurrence of the peak.

In addition, to cost-effectively perform charging of the ESS 520 for lowering the peak upon charging, it is necessary to store power in advance at the time when the cost of supplied power is the cheapest, and use the power to charge the electric vehicle.

In the present invention, while hydrogen in the hydrogen tank 110 is supplied to a hydrogen vehicle, power may be generated through the hydrogen power generator 120, and the generated power may be used to charge the ESS 520. Comparison between the charging cost using the hydrogen-based power generation and the charging cost using the power grid may be performed, and a cheaper charging cost may be selected to perform charging. This may generally reduce the cost for charging the electric vehicle.

According to the composite charging system and method in the present invention as seen above, the power for charging the electric vehicle may be generated by using the hydrogen energy supplied to the hydrogen vehicle. It also may perform charging the electric vehicle effectively and use energy flexibly by integrating the hydrogen energy and the DC power grid while performing charging the hydrogen vehicle and the electric vehicle at the same time. Moreover, if power generation is required due to unstable supply and demand of the power grid, power may be supplied by utilizing a bidirectional AC-DC converter in the grid to help in stabilizing the power grid.

What has been explained above includes one or more example embodiments. Of course, for the purpose of explaining the aforementioned example embodiments, it can be recognized that not all possible combinations of components or methods could be described but a lot of additional combinations and replacements in a variety of example embodiments can be made by those of ordinary skill in the art. Accordingly, the explained example embodiments could include all alternatives, modifications, and adaptations falling within the spirit and scope of what is claimed attached could be included.

INDUSTRIAL AVAILABILITY

The present invention relates to a complex charging system and method for complexly charging an electric vehicle and a hydrogen vehicle, and is applicable to a charging system for charging an electric vehicle or a hydrogen vehicle.

What is claimed is:

1. A composite charging system, comprising:
a hydrogen charger for charging hydrogen to a vehicle;
a hydrogen-based power supply system for generating and supplying power based on hydrogen;
a power grid-based supply system for supplying power from a power grid;
an electrical charger for charging an electric vehicle; and
a battery power supply system for storing power supplied from the hydrogen-based power supply system and the power grid-based supply system, and supplying the stored power to the electrical charger, wherein the battery power supply system includes: an energy storage system (ESS) for storing power and discharging the stored power; and a DC-DC converter for storing power supplied from the hydrogen-based power supply system and the power grid-based supply system, and converting a DC voltage outputted from the ESS to a DC voltage required for input to the electrical charger, wherein time zones comprise an off-peak time, a peak time, and a high-peak time, based on a cost of the power supplied from the power grid, wherein the off-peak time is a time zone where an electricity rate is the cheapest, and the high-peak time is a time zone where the cost of the power supplied is the highest, and the peak time is a time zone which is located between the off-peak time and the high-peak time, wherein the ESS is charged through the power grid-based supply system during the off-peak time, and the ESS is charged through the hydrogen-based power supply system during the peak time and the high-peak time, wherein, in the off-peak time, as a result of comparison between a charging cost through the power grid-based supply system during the off-peak time and the charging cost through the hydrogen-based power supply system, when the charging cost through the power grid-based supply system during the off-peak time is lower than the charging cost through the hydrogen-based power supply system, and when a residual capacity of hydrogen stored in a hydrogen tank is bigger than a predetermined level, power is charged from the power grid-based supply system, and when a second charging cost is lower than a first charging cost, power is charged from the hydrogen-based power supply system, wherein in the peak time, as a result of comparison between the charging cost through the power grid-based supply system during the peak time and the charging cost through the hydrogen-based power supply system, when the charging cost through the power grid-based supply system during the peak time is lower than the charging cost through the hydrogen-based power supply system, and when the residual capacity of hydrogen stored in the hydrogen tank is bigger than the predetermined level, power is charged from the power grid-based supply system, and when the second charging cost is lower than the first charging cost, power is charged from the hydrogen-based power supply system, wherein in the high-peak time, as a result of comparison between the charging cost through the power grid-based supply system during the high-peak time and the charging cost through the hydrogen-based power supply system, when the charging cost through the power grid-based supply system during the high-peak time is lower than the charging cost through the hydrogen-based power supply system, and when the residual capacity of hydrogen stored in the hydrogen tank is bigger than the predetermined level, power is charged from the power grid-based supply system, and when the second charging cost is lower than the first charging cost, power is charged from the hydrogen-based power supply system, wherein, regardless of when the charging cost through the hydrogen-based power supply system is lower than the charging cost through the power grid-based supply system, charging is performed through the power grid-based supply system when the residual capacity of hydrogen stored in the hydrogen tank is less than the predetermined level, wherein the charging cost through the hydrogen-based power supply system is differently set depending on a unit price of purchasing hydrogen when the hydrogen is charged in the hydrogen tank, or periodically updated.

2. The system of claim 1, wherein the hydrogen-based power supply system includes: a hydrogen tank for storing hydrogen; a hydrogen power generator for generating power from the hydrogen; and a DC-DC converter for converting a DC voltage outputted from the hydrogen power generator to a DC voltage required for input to the electrical charger.

3. The system of claim 1, wherein the power grid-based supply system includes: a grid matcher for matching the power grid with a transformer; and an AC-DC converter for converting an AC voltage outputted from the grid matcher to a DC voltage required for input to the electrical charger.

* * * * *